United States Patent
Kobayashi

(10) Patent No.: US 6,595,086 B2
(45) Date of Patent: Jul. 22, 2003

(54) POWER DISTRIBUTION APPARATUS FOR A FOUR-WHEEL DRIVE VEHICLE

(75) Inventor: Toshio Kobayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 20 days.

(21) Appl. No.: 10/025,118

(22) Filed: Dec. 19, 2001

(65) Prior Publication Data

US 2002/0078792 A1 Jun. 27, 2002

(30) Foreign Application Priority Data

Dec. 21, 2000 (JP) .......................... 2000-389361

(51) Int. Cl.[7] .............................................. F16H 37/06
(52) U.S. Cl. ..................... 74/665; 475/225; 192/85 AA
(58) Field of Search ..................... 74/665 T, 606 R, 74/665 GC, 665 H; 180/247, 248; 192/85 AA, 87.13, 87.18; 475/198, 199, 206, 225

(56) References Cited

U.S. PATENT DOCUMENTS

| | | | |
|---|---|---|---|
| 4,708,227 A | * 11/1987 | Kitade | ......................... 477/171 |
| 4,711,317 A | * 12/1987 | Sakakiyama | ................. 180/197 |
| 4,711,318 A | * 12/1987 | Kitade | ......................... 180/247 |
| 4,739,678 A | * 4/1988 | Miura et al. | ............... 74/665 T |
| 4,875,698 A | * 10/1989 | Uchiyama | .................... 180/233 |
| 4,915,189 A | * 4/1990 | Sakai | ........................ 180/247 |
| 4,938,306 A | * 7/1990 | Sumiyoshi et al. | .......... 180/233 |
| 5,098,351 A | * 3/1992 | Kobayashi | .................... 475/86 |
| 5,109,944 A | * 5/1992 | Torii | ........................... 180/248 |
| 5,148,903 A | * 9/1992 | Kobayashi et al. | ...... 192/85 AA |
| 5,234,091 A | * 8/1993 | Kobayashi et al. | ...... 192/85 CA |
| 5,415,598 A | * 5/1995 | Sawase et al. | ................. 475/86 |
| 6,135,229 A | * 10/2000 | Arimatsu | ..................... 180/248 |
| 6,231,470 B1 | * 5/2001 | Cook et al. | .................. 475/206 |
| 6,386,348 B1 | * 5/2002 | Kunii | ........................... 192/35 |

FOREIGN PATENT DOCUMENTS

| | | | | |
|---|---|---|---|---|
| JP | 6-92156 | 4/1994 | ......... | B60K/17/348 |
| JP | 6-107019 | 4/1994 | ......... | B60K/17/348 |

* cited by examiner

Primary Examiner—Charles A. Marmor
Assistant Examiner—David D. Le
(74) Attorney, Agent, or Firm—Darby & Darby

(57) ABSTRACT

A hydraulic multi-plate clutch is disposed between a second gear for changing the transmission direction of drive force to a parallel position and an engine. An oil pressure driving portion for actuating the hydraulic multi-plate clutch comprises integrally an oil pressure control mechanism portion mainly constituted by an oil pressure control valve and oil paths, an oil pump and an electric pump motor which are adapted to generate hydraulic oil pressure and an accumulator for smoothing the hydraulic oil pressure to prevent pulsations, and is disposed at a substantially horizontal side position of the hydraulic multi-plate clutch.

4 Claims, 3 Drawing Sheets

POWER DISTRIBUTION APPARATUS FOR A FOUR-WHEEL DRIVE VEHICLE

BACKGROUND OF THE INVENTION

The present invention relates to a power distribution apparatus for a four-wheel drive vehicle. The power distribution apparatus efficiently distributes drive force from a transmission, which is connected to a transversely laid out engine, to front and rear wheels via a hydraulic multi-plate clutch that is disposed together with required constituent components thereof efficiently.

In a conventional power distribution apparatus for a four-wheel drive vehicle, a distribution of a predetermined power to front and rear wheels is usually accomplished by controlling a clamping force of a hydraulic multi-plate clutch as a transfer clutch. For controlling the clamping force of the hydraulic multi-plate clutch, it is required to have at least an oil pressure control portion having a control valve for varying the clamping force of the hydraulic multi-plate clutch, and an oil pressure source for generating an oil pressure for the hydraulic multi-plate clutch.

As the most popular case of an arrangement of an engine, the engine is arranged on a front side of a vehicle body in order to secure a passenger space as wide as possible in the vehicle body. In addition, as the arrangement of the engine, a transversal arrangement is adopted in such a manner that an output shaft of the engine is disposed in parallel with a wheel shaft. This construction also applies to a four-wheel drive vehicle.

As a four-wheel drive vehicle having a transversely laid out front engine which is described above, for example, Japanese Unexamined Patent Publication No. Hei. 6-92156 discloses a construction in which a hydraulic multi-plate clutch distributes to the rear wheel side, a predetermined drive force inputted into a differential from a transmission. The hydraulic multi-plate clutch is mounted on a front drive shaft beside a differential for the front wheels.

In addition, Japanese Patent Unexamined Publication No. Hei 6-107019 discloses a four-wheel drive vehicle having a hydraulic multi-plate clutch. The hydraulic multi-plate clutch that distributes a drive force to the rear wheel side is provided between a rear end of a gear shaft extending rearwards from one of a pair of direction changing gears for changing a drive force transmission direction to the rear wheel side and a distal end of a propeller shaft.

However, in a case where the hydraulic multi-plate clutch is disposed on the axis of the front drive shaft as described in the former example of the conventional power distribution apparatus, a large modification needs to be made to a two-wheel drive portion including the front differential. This makes it difficult to use a transaxle for a two-wheel drive vehicle commonly for a four-wheel drive vehicle.

In addition, in a case where the hydraulic multi-plate clutch is provided between the rear end of the gear shaft extending rearward and the distal end of the propeller shaft as done in the latter example of the conventional power distribution apparatus, the diameter of the clutch portion of the transfer unit is increased longitudinally and this leads to the enlargement of the transfer unit. In addition, this enlarged portion of the clutch portion typically runs across the vehicle body chassis structure such as a steering gearbox and a cross member thereabove or therebelow. Therefore in order to maintain a good positional relationship between those members and the transfer unit, the steering gearbox needs to be re-located and the cross member needs to be curved, thus making the vehicle structure complex. In addition, allowing the enlarged hydraulic clutch portion to run across the steering gearbox and the cross member thereabove or therebelow unfavorably reduces the space within the passenger compartment and lowers the minimum road clearance of the vehicle. Furthermore, since the oil pressure control mechanism portion and the oil pressure source is provided in the hydraulic multi-plate clutch as described before, these members need to be disposed efficiently within a limited space. Because of these conventional arrangements, consideration is required in maintaining the oil-tightness of the difference in nature between the operating fluid for operating the hydraulic multi-plate clutch and the gear fluid within the transfer unit. In addition, consideration is also required to be given to the productivity of transmissions and transfer units, as well as the easy access to the transmission and the transfer unit for servicing them for maintenance after they are disposed on the vehicle.

SUMMARY OF THE PRESENT INVENTION

The present invention was made in view of the above problems and objects thereof are to provide a power distribution apparatus for a four-wheel drive vehicle which is compact in size, which is subject to no limitations as to the apparatus' position relative to the vehicle body structure such as the steering gearbox and the cross member, which can secure with ease the oil-tightness for hydraulic fluid for operating the hydraulic multi-plate clutch, which is superior in providing good productivity of transmissions and transfer units and serviceability thereof for maintenance after they are installed, and which is easy to be installed on the vehicle.

With a view to attain the above objects, according to a first aspect of the present invention, there is provided a power distribution apparatus for a four-wheel drive vehicle comprising: a transversely laid out front engine outputting a drive force via a transmission coupled thereto; a transfer unit including: a pair of direction changing gears for changing a transmission direction of the drive force to a rear direction of the vehicle; a first gear provided on a gear shaft extending rearward from one of the pair of direction changing gears; a second gear adapted to mesh with the first gear so as to transfer the drive force transmission direction to be in parallel with the rear direction; an output shaft adapted to rotatably pass through an axial center of a gear shaft of the second gear so as to output the drive force to the rear direction of the vehicle; a hydraulic multi-plate clutch for variably transmitting torque between the gear shaft of the second gear and the output shaft; and an oil pressure control mechanism integrally incorporating at least an oil pressure source for generating a hydraulic oil pressure for the hydraulic multi-plate clutch and an oil pressure control portion for controlling the clamping force of the hydraulic multi-plate clutch; wherein the hydraulic multi-plate clutch is disposed on the axial center of the second gear at a position closer to the engine than the second gear, the oil pressure control mechanism portion is disposed close to a side of the hydraulic multi-plate clutch, and the drive force is distributed to rear wheels via the hydraulic multi-plate clutch of the transfer unit disposed to the rear of the engine.

According to a second aspect of the present invention, there is provided a power distribution apparatus for a four-wheel drive vehicle as set forth in the first aspect of the present invention, wherein the hydraulic multi-plate clutch and the oil pressure control mechanism portion are accommodated and disposed independently and oil-tightly relative to a gear mechanism portion.

According to a third aspect of the present invention, there is provided a power distribution apparatus for a four-wheel drive vehicle as set forth in the first or second aspect of the present invention, wherein an accommodation chamber for accommodating therein the hydraulic multi-plate clutch has an opening in one side thereof, and where a member for closing the opening is the oil pressure control mechanism portion.

Namely, in the power distribution apparatus for a four-wheel drive vehicle according to the first aspect of the present invention, the transmission direction of the drive force from the transmission coupled to the transversely laid out front engine is changed to the rear by way of the pair of direction changing gears. The drive force is transmitted from the first gear, which is provided on the gear shaft extending to the rear from one of the pair of direction changing gears, to the second gear, so that the transmission direction of the drive force is transfered in parallel. Then, when the control valve in the oil pressure control portion is actuated so that the predetermined oil pressure is applied to the hydraulic multi-plate clutch by the hydraulic fluid, the hydraulic multi-plate clutch is clamped. The drive force corresponding to the clamping force of the clutch is then transmitted from the gear shaft of the second gear to the output shaft. Therefore, the transmitted drive force is outputted to the rear wheel side. Here, since the hydraulic multi-plate clutch is disposed between the second gear and the engine, the transfer unit can be constructed and laid out in a compact manner in both transverse and longitudinal directions. In addition, the hydraulic multi-plate clutch is subject to little positional limitation relative to the vehicle body structure such as the steering gearbox and the cross member, thus providing superior mounting properties. Furthermore, because the hydraulic multi-plate clutch is disposed between the second gear and the engine, the oil pressure control portion and the oil pressure source may be integrally coupled together disposed at the substantially horizontal side position on the hydraulic multi-plate clutch as the oil pressure control mechanism portion. This allows the oil pressure control mechanism portion to be disposed closer to the relatively spacious rear of the engine, thereby solving the problem that the oil pressure control mechanism portion occupies the space on the transmission side. In addition, since the oil pressure control mechanism portion is constructed by integrally coupling the oil pressure control portion and the oil pressure source, as with the power distribution apparatus for a four-wheel drive vehicle according to the second aspect of the present invention, the hydraulic multi-plate clutch and the oil pressure control mechanism portion are accommodated and disposed independently and in an oil-tight manner relative to the gear mechanism portion, whereby the oil-tightness can easily be secured relative to the other transmission oil and the like. Furthermore, since the oil pressure control mechanism portion is constructed by integrally coupling the oil pressure control portion and the oil pressure source, there is no need to form oil paths or the like on the transmission side. Therefore, the transmission can be commonly used for both two-wheel drive vehicles and four-wheel drive vehicles. Moreover, the productivity of transfer units and the serviceability thereof for maintenance after installation can be improved.

According to the third aspect of the present invention, there is provided the power distribution apparatus for a four-wheel drive vehicle as set forth in the first or second aspect of the present invention, wherein the transfer unit further includes an accommodation chamber for accommodating the hydraulic multi-plate clutch therein, the accommodation chamber has an opening in one side thereof, and where the opening is closed by the oil pressure control mechanism portion. Thus, the power distribution apparatus can be made more space efficient and the serviceability for maintenance can also be improved.

DETAILED DESCRIPTION OF THE INVENTION

Figure 1:
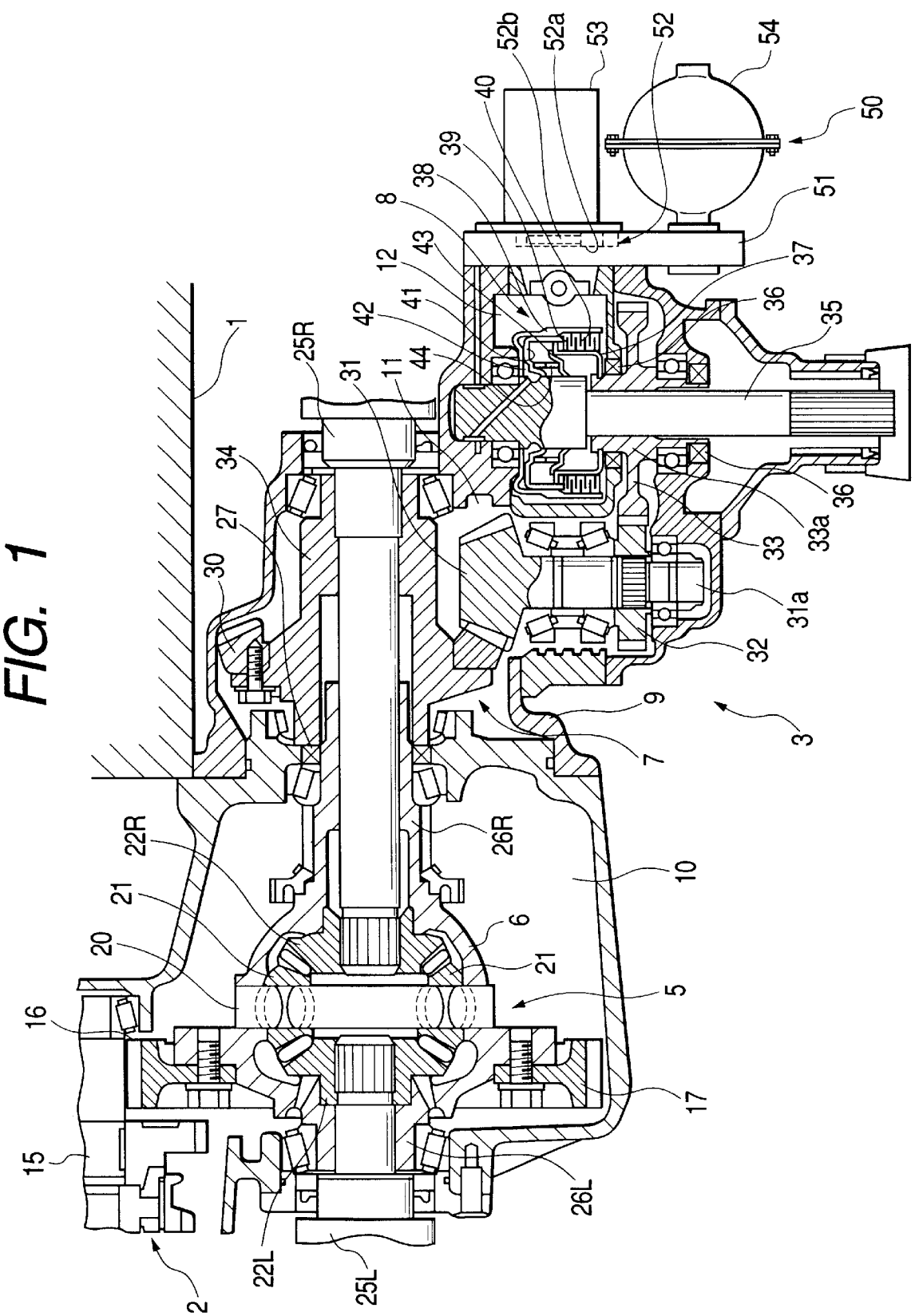
FIG. 1 is a sectional view of a main part of a transfer unit.
Figure 2:
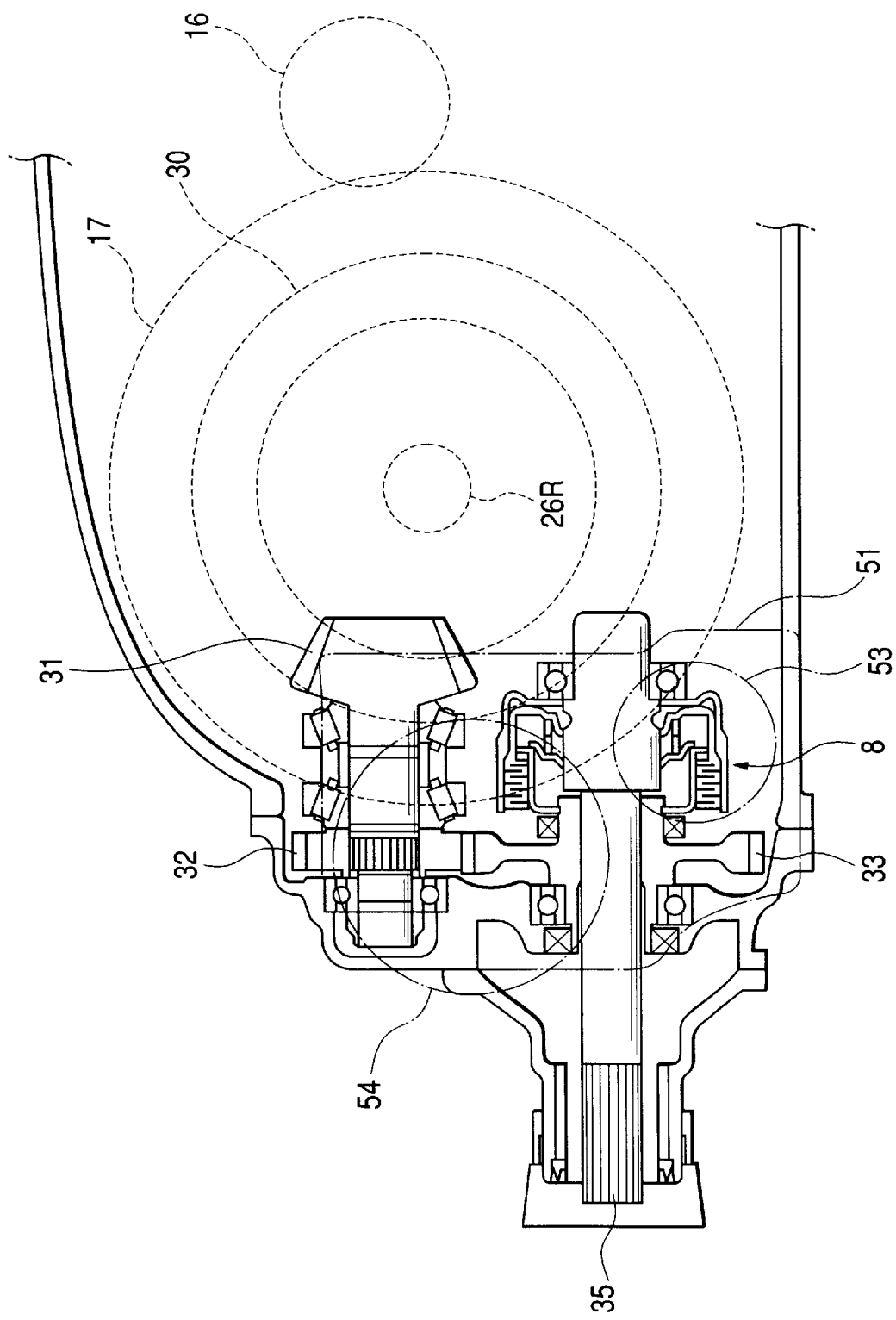
FIG. 2 is a schematic explanatory view of a positional relationship of an oil pressure control circuit and the like as viewed from the direction of a front wheel shaft.
Figure 3:
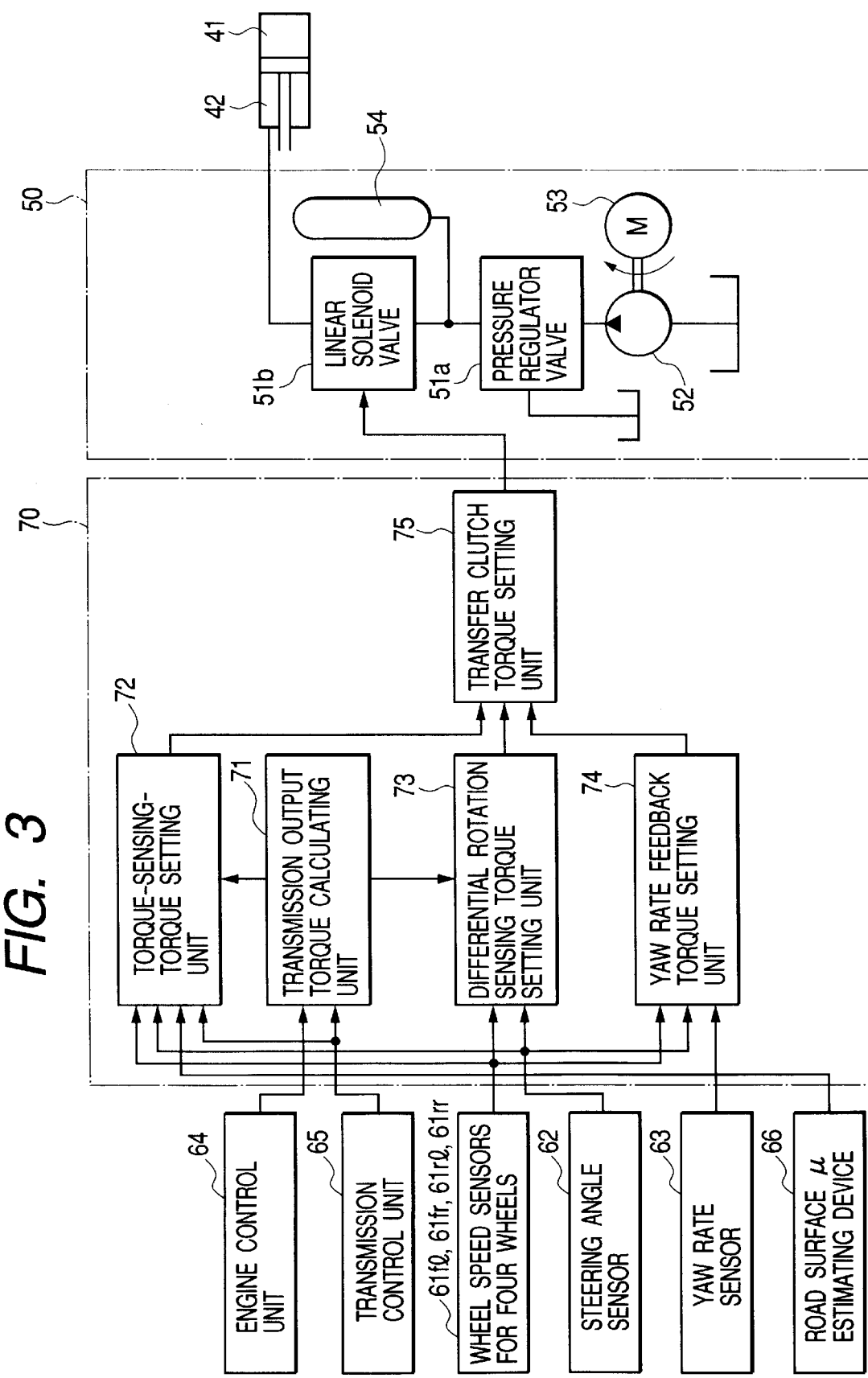
FIG. 3 is a block diagram explaining the function of power distribution control and the construction of an oil pressure control mechanism portion.

Embodiments of the present invention will be described hereinafter with reference to appended drawings. FIGS. 1 to 3 show an embodiment according to the present invention. FIG. 1 is a sectional view of a main part of a transfer unit, FIG. 2 is a schematic explanatory view of a positional relationship of an oil pressure control circuit and the like as viewed from the direction of a front wheel shaft, and FIG. 3 is a block diagram explaining the function of power distribution control and the construction of an oil pressure control mechanism portion.

In FIG. 1, reference numeral 1 denotes a transversely laid out engine in a front engine compartment of a vehicle, and a transmission 2 coupled with the engine 1 is disposed on an output shaft of the engine 1 in the left-hand side of the hood.

In addition, a transfer unit 3 is integrally provided with the engine 1 and the transmission 2 and disposed at the rear part of the engine 1 and the transmission 2, whereby a drive force outputted from the engine 1 is subject to a predetermined speed change at the transmission and is then distributed to a rear wheel side by the transfer unit 3. Here, as shown in the figure, the transfer unit 3 is disposed to the rear of the transmission 2 in such a manner as to be offset toward the engine 1 side.

The transfer unit 3 is constituted by a gear mechanism portion 7 for transmitting power, which is transmitted to a differential case 6 of a front differential 5 for transmitting drive force from the transmission 2 to a front wheel side and to the rear wheel side. The transfer unit 3 is further constituted by a hydraulic multi-plate clutch 8 acting as a transfer clutch for continuously variably controlling the distribution of the drive force to the rear wheel side in accordance with running conditions and driving conditions. The front differential 5 is integrally accommodated in a differential accommodating compartment 10. The gear mechanism 7 is integrally accommodated in a gear accommodating compartment 11 formed in a transfer case 9. The hydraulic multi-plate clutch 8 is integrally accommodated in a clutch accommodating compartment 12 formed in the transfer case 9.

The front differential 5 comprises a final gear 17 around the outer circumference of the differential case 6. This final gear 17 is adapted to mesh with a drive gear 16 fixedly provided on an output shaft 15 of the transmission 2.

The front differential 5 is a known bevel gear type differential and is constituted by a pair of differential pinions 21, 21 and left and right side gears 22L, 22R. The pair of differential pinions 21, 21 are rotatably supported on a pinion shaft 20 fixedly provided within the differential case 6. The left and right side gears 22L, 22R are adapted to mesh with the differential pinions 21, 21. In addition, left and right front wheel drive shafts 25L, 25R are fitted in the left and right side gears 22L, 22R via tube portions 26L, 26R extending transversely from the differential case 6. Thus, the drive force transmitted to the side gears 22L, 22R from the differential case 6 via the differential pinions 21, 21 is then transmitted to left and right front wheels via the drive shafts 25L, 25R of the left and right front wheels.

In addition, the right side tube portion 26R of the differential case 6 is extended to the interior of the gear accommodating compartment 11. The drive force is transmitted to the gear mechanism portion 7 via the extended right side tube portion 26R.

An oil seal 27 retained on the transfer case 9 is slidably connected to the outer circumference of the right side tube portion 26R at an intermediate position along the length thereof. Therefore, the oil-tightness within the differential accommodating compartment 10 and the gear accommodating compartment 11 is maintained. Note that in the case where lubricating oil for lubricating the front differential 5 and lubricating oil for lubricating the gear mechanism portion 7 are the same, the oil seal 27 may be omitted.

The gear mechanism portion 7 comprises a pair of direction changing gears (first and second direction changing gears) 30, 31 comprising in turn hypoid gears and a pair of gears (first and second gears) 32, 33 comprising in turn helical gears.

The first direction changing gear 30 is fixedly provided on a hollow transfer shaft 34 that is spline-fitted on the outer circumference of a distal end of the tube portion 26R. The second direction changing gear 31 meshes with the first direction changing gear 30 to thereby change the transmission direction of the drive force to the rear.

A gear shaft (a pinion shaft) 31a of the second direction changing gear 31 extends rearwardly. The first gear 32 is spline fitted on a rear end of this pinion shaft 31a. The second gear 33 meshes with the first gear 32 at a right side position of the first gear 32. A gear shaft 33a of the second gear 33 is formed hollow, and an output shaft 35 for outputting the drive force to the rear is allowed to rotatably pass through the hollow gear shaft 33a.

In addition, the output shaft 35 is clamped to be freely disengaged with transfer clutch torque. The transfer clutch torque is set by a drive force distribution control portion 70, which will be described later, and imparted by an oil pressure control mechanism portion 50 via the gear shaft 33a of the second gear 33 and the hydraulic multi-plate clutch 8. Namely, the hydraulic multi-plate clutch 8 may be a torque transmission capacity variable transfer clutch. When the hydraulic multi-plate clutch 8 is clamped with a predetermined transfer clutch torque, the drive force transmitted to the second gear 33 is distributed to the output shaft 35 according to the transfer clutch torque. Then, the drive force distributed to the output shaft 35 is transmitted to a rear differential via a propeller shaft (both not shown) spline fitted on the rear end of the output shaft 35.

Here, the clutch accommodating compartment 12 for accommodating the hydraulic multi-plate clutch 8 is partitioned and formed on the axial center of the output shaft 35 on the engine 1 side ahead of the second gear 33. The distal ends of the gear shaft 33a and the output shaft 35 extend into this clutch accommodating compartment 12.

A pair of oil seals 36, 36 are held in the transfer case 9 and a housing supporting the gears 32, 33. The pair of oil seals 36, 36 are brought into slidable contact with the gear shaft 33a at an intermediate position along the length thereof. These oil seals 36, 36 are provided in parallel with each other in such a manner that their sealing directions are opposite to each other, whereby the oil-tightness between the gear accommodating compartment 11 and the clutch accommodating compartment 12 is ensured.

In the clutch accommodating compartment 12, a clutch hub 37 of the hydraulic multi-plate clutch 8 is fixedly provided on the gear shaft 33a. A clutch drum 38 is fixedly provided on the output shaft 35.

A plurality of drive plates 39 are fitted on the outer circumference of the clutch hub 37. A plurality of driven plates 40 are fitted in the clutch drum 38. Both of the plurality of drive plates 39 and the plurality of driven plates 40 are disposed alternately between the clutch hub 37 and the clutch drum 38. In addition, a clutch piston 41 is disposed on one end of the drive plates 39 and the driven plates 40 (on the engine 1 side) whereas a retaining plate (not shown) is disposed on the other end thereof (on the second gear 33 side).

Then, the clutch piston 41 slidably contacts the clutch drum 38 and the output shaft 35. A front side gap surrounded by the clutch piston 41 and the clutch drum 38 is formed as an oil pressure compartment 42. In addition, a retainer 43 is provided in such a manner as to confront the clutch piston 41, and is held on the output shaft 35. A return spring 44 is interposed between the retainer 43 and the clutch piston 41, whereby the clutch piston 41 is biased forward by means of this return spring 44.

An opening is formed in a right side portion of the clutch accommodating compartment 12, i.e., a substantially horizontal side position of the hydraulic multi-plate clutch 8. The oil pressure control mechanism portion 50 is coupled to close this opening portion. The oil pressure control mechanism portion 50 is adapted to supply the oil pressure of hydraulic fluid to the hydraulic multi-plate clutch 8.

The oil pressure control mechanism portion 50 comprises an oil pressure control portion 51 constituted mainly by an oil pressure control valve and oil paths, an oil pump 52 and an electric pump motor 53 which act as an oil pressure source for generating hydraulic oil pressure to be applied to the hydraulic multi-plate 8 and an accumulator 54 for smoothing the hydraulic oil pressure for the hydraulic multi-plate clutch 8 to prevent pulsations.

The oil pressure control portion 51 comprises a pressure regulator valve 51a for regulating the oil pressure supplied by the oil pump 52 to an optimum pressure (line pressure) according to the driving conditions. The oil pressure control portion 51 comprises a control valve (a linear solenoid valve) 51b interposed along an oil path for providing a communication between the pressure regulator valve 51a and the oil pressure compartment 42 in the hydraulic multi-plate clutch 8 for variably controlling the oil pressure to the oil pressure compartment 42, i.e., the hydraulic oil pressure for the hydraulic multi-plate clutch 8 based on an output signal from the drive force distribution control portion 70 (see FIG. 3).

In addition, a spherical diaphragm type accumulator 54 which is integrally fixed to a right side of the oil pressure control portion 51 is connected to a position along an oil path for connecting the pressure regulator valve 51a to the linear solenoid valve 51b.

Furthermore, the oil pump 52 is constituted as, for example, an internal gear pump. A motor shaft (not shown) of the electric pump motor 53 integrally fixed to the oil pressure control portion 51 from the right side thereof protrudes into a pump casing 52a carved in the oil pressure control portion 51 and a pump gear 52b is rotatably attached to the motor shaft.

Note that the positional relationship between the accumulator 54 fixed to the oil pressure control portion 51 and the electric pump motor 53 is, as shown by alternate long and short dash lines in FIG. 2, such that the accumulator 54 is located at a diagonally upward and rearward position relative to the electric pump motor 53.

Thus, the productivity and serviceability for maintenance of the apparatus can be improved by providing the oil pump 52 in the oil pressure control portion 51 and attaching the electric pump motor 53 and the accumulator to thereby integrally assemble them as the oil pressure control mechanism portion 50. In addition, the overall length of the oil path can be reduced to thereby facilitate the formation of the oil path and provide a simple construction, whereby the design period can be reduced and the production costs can be lowered. Furthermore, since the transmission 2 side and the oil pressure control mechanism portion 50 are constructed to be independent from each other completely, the oil-tightness can easily be secured between the transmission 2 side and the oil pressure control mechanism 50 side. In addition, since the transmission 2 and the oil pressure control mechanism portion 50 are constructed to be independent from each other completely, the apparatus can be applied to various types of transmissions (a manual transmission, an automatic transmission, a continuously variable transmission, or the like) and hence provides wide versatility.

Next, a specific example of the control of the hydraulic multi-plate clutch 8 according to the present invention will be described with reference to FIG. 3. Output signals (transfer clutch torque signals) to the oil pressure control mechanism portion 50 for supplying the hydraulic oil pressure to the hydraulic multi-plate clutch 8 are designed to be set at the drive force distribution control portion 70. Sensors and the like are provided on the vehicle for detecting parameters required to set the transfer clutch torque. The sensors and the like are connected to the drive force distribution control portion 70.

To be specific, the wheel speeds ωfl, ωfr, ωrl, ωrr of the four wheels are detected by wheel speed sensors 61fl, 61fr, 61rl, 61rr. The steering angle θ H is detected by a steering angle sensor 62. The yaw rate γ is detected by a yaw rate sensor 63. These values detected are then inputted into the drive force distribution control portion 70. Engine speed Ne and engine output torque Te is derived from an engine control unit 64 for performing various types of controls including fuel injection control. Turbine speed Nt and a gear ratio i is derived from a transmission control unit 65 for executing the change-speed control of an automatic transmission. Then, these values are inputted into the drive force distribution control portion 70. A torque sensing torque Tt, a differential rotation sensing torque Ts and a yaw rate feedback torque Ty are set based on the parameters so inputted at setting units 72, 73, 74 in the drive force distribution control portion 70. Then, these set torques are inputted in a transfer clutch torque setting unit 75, whereby a transfer clutch torque Ttr is set.

Thus, according to the present invention, the transfer clutch torque Ttr is set by the torque sensing torque Tt, the differential rotation torque Ts and the yaw rate feedback torque Ty. The clamping force of the hydraulic multi-clutch plate 8 is controlled optimally in accordance with the running conditions and driving conditions of the vehicle.

In the drive force distribution apparatus for a four-wheel drive according to the present invention, in the drive force distribution control portion 70, firstly, a transmission output torque To is calculated at a transmission output torque calculating unit 71. A torque sensing torque Tt is calculated by at the torque sensing torque setting unit 72. A differential rotation sensing torque Ts is calculated by at the differential rotation sensing torque setting unit 73. In addition, a yaw rate feedback torque Ty is calculated at the yaw rate feedback torque setting unit 74. Then, a transfer clutch torque Ttr is calculated and set based on the torque sensing torque Tt, the differential rotation sensing torque Ts and the yaw rate feedback torque Ty by at a transfer torque clutch setting unit 75 . The transfer clutch torque calculated and set is then outputted to the oil pressure control mechanism portion 50.

In the oil pressure control mechanism portion 50, oil pressure generated by both of the electric pump motor 53 and the oil pump 52 is regulated to an optimum line pressure according to the driving conditions by the pressure regulator valve 51a and is then applied to the linear solenoid valve 51b. Then, when a transfer clutch torque Ttr signal is outputted from the drive force distribution control portion 70 to the linear solenoid valve 51b, the linear solenoid valve 51b is actuated to vary the oil pressure in the oil pressure compartment 42 in the hydraulic multi-plate clutch 8 according to the transfer clutch torque Ttr. The clamping force of the hydraulic multi-plate clutch 8 is varied by the clutch piston 41. Here, the hydraulic oil pressure to the hydraulic multi-plate clutch 8 is smoothed by the accumulator 54 to thereby prevent pulsations.

On the other hand, the drive force is changed to the predetermined speed, when it is transmitted from the engine 1 to the transmission 2 and is then transmitted from the output shaft 15 of the transmission 2 to the differential case 6 via the final gear 17. The drive force is then transmitted to the left and right front wheels via the pinion shaft 20, the differential pinions 21, 21, the side gears 22L, 22R and the drive shafts 25L, 25R.

In addition, the drive force transmitted to the differential case 6 is then transmitted to the tube portion 26R, and the drive force transmitted to this tube portion 26R is then transmitted to the transfer shaft 34. The drive force transmitted to the transfer shaft 34 is turned in a 90 degree angle to the rear via the first and second direction changing gears 30, 31, and is thereafter transmitted to the pinion shaft 31a. Furthermore, the drive force transmitted to the pinion shaft 31a is turned to the right in a parallel via the first and second gears 32, 33, and is thereafter transmitted to the gear shaft 33a. Then, the drive force transmitted to the gear shaft 33a is variably (for example, the front and rear distribution ratio is varied between 100:0 and 50:50) distributed to the output shaft 35 according to the clamping force of the hydraulic multi-clutch 8 set as described above, and is then transmitted to the rear wheel side via the propeller shaft, not shown.

Thus, according to the present invention, the axial center of the pinion shaft 31a for transmitting the drive force, which is turned by the first and second direction changing gears 30, 31 to the rear wheel side, is changed to the parallel position via the first and second gears 32, 33. The hydraulic multi-plate clutch 8 is disposed on the changed axial center of the second gear 33 in the gap closer to the engine 1 side than the second gear 33, whereby the enlargement of the transfer unit 3 can be prevented.

Namely, the hydraulic multi-plate clutch 8 can be disposed in the gap between the engine 1 and the gear mechanism portion 7 by displacing the axial center of the pinion shaft 31a in parallel via the first and second gears 32, 33. Accordingly there is no need to dispose the hydraulic multi-plate clutch 8 on the axial center of the front wheel drive shafts 25L, 25R or the axial center of the pinion shaft 31a. Consequently, the transfer unit 3 can be constructed compact and moreover the vertical height position of the output shaft 35 can be set to an optional height, thereby providing good vehicle mounting properties.

In particular, since there is no need to dispose the hydraulic multi-plate clutch 8 on the axial center of the pinion shaft 31a, the hydraulic multi-plate clutch 8 is prevented from running across the steering gearbox and the cross member which are disposed transversely at the front of the vehicle body thereabove or therebelow. Therefore good vehicle mounting properties can be provided. In other words, good relative positional relationship can be secured between the steering gearbox and the cross member and the hydraulic multi-plate clutch 8 without re-locating the steering gearbox and curving the cross member. Therefore, the crash safety can be easily ensured with the simple vehicle construction. In addition, since there is no need to run the hydraulic multi-plate clutch 8 across the steering gearbox and the cross member, the space within the passenger compartment and the minimum road clearance can be secured maintained.

Additionally, the productivity and serviceability for maintenance of the apparatus can be improved by providing the oil pump 52 in the oil pressure control portion 51 and attaching the electric pump motor 53 and the accumulator to thereby integrally assemble them as the oil pressure control mechanism portion 50. In addition, the overall length of the oil path can also be reduced to thereby facilitate the formation of the oil path and provide a simple construction, whereby the design period can be reduced and the production costs can be lowered. Furthermore, since the transmission 2 side and the oil pressure control mechanism portion 50 are constructed to be independent from each other completely, oil-tightness can easily be secured between oil on the transmission 2 side and oil on the oil pressure control mechanism 50 side. In addition, since the transmission 2 side and the oil pressure control mechanism portion 50 are independent from each other completely, the apparatus can be applied to various types of transmissions (a manual transmission, an automatic transmission, a continuously variable transmission or the like) and hence, provides wide versatility.

While in the embodiment of the present invention, the example has been described in which the axial center of the output shaft 35 is displaced to the right via the pair of gears 32, 33, the present invention is not limited thereto and the axial center of the output shaft 35 may be changed or displaced to any position around the circumference of the pinion shaft 31a. Namely, the axial center of the output shaft 35 may be displaced upwardly or downwardly according to variations of the vehicle body structure, as well as positions of the steering gearbox and the like.

As has been described heretofore, according to the present invention, superior advantages are provided that the apparatus can be made compact and hence is subject to little positional limitation relative to the vehicle body structure such as the steering gearbox and the cross member, that the oil-tightness of hydraulic oil for operating the hydraulic multi-plate clutch can easily be secured, that the superior productivity of the transmission and transfer unit and serviceability thereof for maintenance after they are installed can be provided and that the good mounting properties can be provided.

What is claimed is:

1. A power distribution apparatus for a four-wheel drive vehicle having a transversely laid out front engine outputting a drive force via a transmission coupled thereto, comprising:
   a transfer unit disposed at a rear of said engine and including:
      a pair of direction changing gears for changing a transmission direction of said drive force to a rear direction of said vehicle;
      a first gear provided on a gear shaft extending rearward from one of said pair of direction changing gears;
      a second gear meshed with said first gear so as to transfer said drive force transmission direction to be parallel with said rear direction;
      an output shaft adapted to rotatably pass through an axial center of a gear shaft of said second gear so as to output said drive force to said rear direction of said vehicle;
      a hydraulic multi-plate clutch for variably transmitting torque between said gear shaft of said second gear and said output shaft; and
      an oil pressure control mechanism integrally incorporating at least an oil pressure source for generating a hydraulic oil pressure for said hydraulic multi-plate clutch and an oil pressure control portion for controlling a clamping force of said hydraulic multi-plate clutch;
   wherein said hydraulic multi-plate clutch is disposed on an axial center of said second gear at a position closer to said engine than said second gear, said oil pressure control mechanism portion is disposed close to a side of said hydraulic multi-plate clutch, and said drive force is distributed to rear wheels of said vehicle via said hydraulic multi-plate clutch of said transfer unit.

2. The power distribution apparatus for a four-wheel drive vehicle as set forth in claim 1, wherein said transfer unit further including an accommodation chamber for accommodating said hydraulic multi-plate clutch therein, said accommodation chamber includes an opening in one side thereof which is operable to be closed by said oil pressure control mechanism portion.

3. The power distribution apparatus for a four-wheel drive vehicle as set forth in claim 1, wherein said hydraulic multi-plate clutch and said oil pressure control mechanism portion are accommodated and disposed independently and in an oil-tight manner relative to a gear mechanism portion.

4. The power distribution apparatus for a four-wheel drive vehicle as set forth in claim 3, wherein said transfer unit further including an accommodation chamber for accommodating said hydraulic multi-plate clutch therein, said accommodation chamber includes an opening in one side thereof which is operable to be closed by said oil pressure control mechanism portion.

* * * * *